United States Patent [19]
George et al.

[11] Patent Number: 5,374,097
[45] Date of Patent: Dec. 20, 1994

[54] UNIVERSAL VISOR MOUNTING SYSTEM

[75] Inventors: Philip C. George; David B. Busch, both of Holland, Mich.

[73] Assignee: Prince Corporation, Holland, Mich.

[21] Appl. No.: 47,869

[22] Filed: Apr. 15, 1993

[51] Int. Cl.⁵ .................................................. B60J 3/00
[52] U.S. Cl. ................................. 296/97.5; 296/97.9; 362/83.1
[58] Field of Search .................... 296/97.1, 97.2, 97.5, 296/97.9, 97.12; 362/83.1, 1.41

[56] References Cited

U.S. PATENT DOCUMENTS

| | | |
|---|---|---|
| 2,033,391 | 4/1935 | Muench . |
| 2,915,937 | 12/1959 | Winchell . |
| 3,405,969 | 10/1968 | Creel ................... 296/97.1 |
| 3,716,269 | 2/1973 | Herr et al. ............. 296/97.1 |
| 4,213,169 | 7/1980 | Kempker . |
| 4,541,663 | 9/1985 | Schwanitz et al. . |
| 4,576,409 | 3/1986 | Ebert ................... 296/97.1 |
| 4,623,188 | 11/1986 | Juraschek et al. . |
| 4,668,005 | 5/1987 | Dietz . |
| 4,858,983 | 8/1989 | Whik et al. ........... 296/97.1 X |
| 4,984,137 | 1/1991 | Maemura . |
| 4,989,911 | 2/1991 | Van Order . |
| 4,999,746 | 3/1991 | Svensson . |
| 5,004,289 | 4/1991 | Lanser et al. . |
| 5,011,211 | 4/1991 | Svensson .............. 296/97.1 |
| 5,011,212 | 4/1991 | Viertel et al. . |
| 5,031,953 | 7/1991 | Miller . |
| 5,061,005 | 10/1991 | Van Order et al. . |
| 5,221,120 | 6/1993 | Viertel et al. ......... 296/97.1 |

FOREIGN PATENT DOCUMENTS

| | | | |
|---|---|---|---|
| 500350 | 3/1954 | Canada ............... | 296/97.12 |
| 1245677 | 9/1971 | United Kingdom ..... | 296/97.9 |

*Primary Examiner*—Jesus D. Sotelo
*Assistant Examiner*—Gary C. Hoge
*Attorney, Agent, or Firm*—Price Heneveld Cooper DeWitt & Litton

[57] ABSTRACT

A visor mounting system for mounting any one of a variety of different visor bodies of different shapes including a housing with a pivot rod assembly and a torque device which extends within the housing which further includes a blade-like frame which extends into the pocket of a visor body for coupling the mounting system to the visor body. Preferably, the frame is a mirror frame with a mirror and the housing including a cover for the mirror. In a preferred embodiment, the mounting assembly also includes a source of illumination for the mirror.

11 Claims, 5 Drawing Sheets

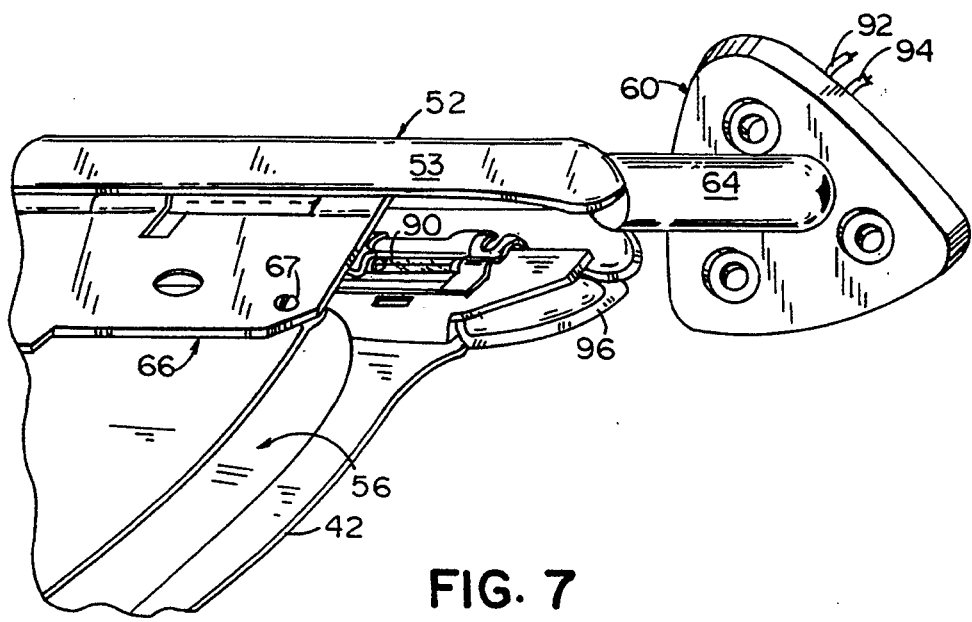
FIG. 7
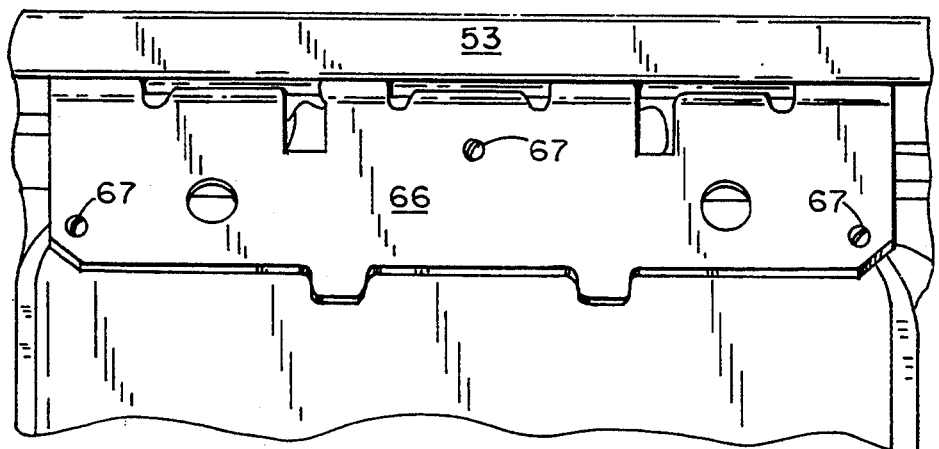
FIG. 8
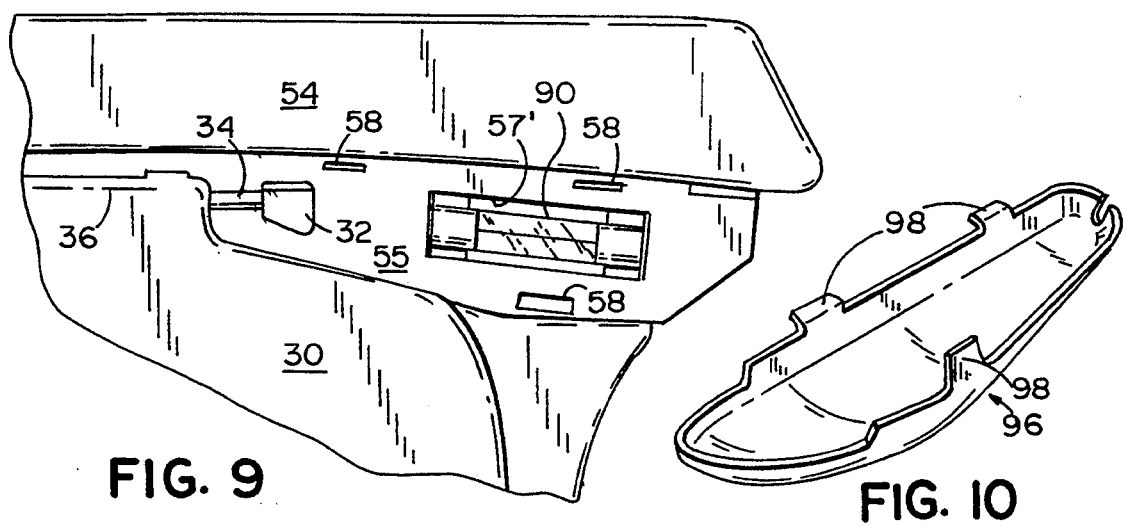
FIG. 9
FIG. 10

UNIVERSAL VISOR MOUNTING SYSTEM

BACKGROUND OF THE INVENTION

The present invention pertains to vehicle sunvisors and particularly to a system for mounting any one of a variety of different visor bodies using a universal bracket assembly.

Visors are manufactured in a variety of different shapes depending on the vehicle to which they are mounted. Some visors, for example, are mounted by a single visor mounting elbow bracket at one end while others include different types of auxiliary mounting posts at an end remote from the elbow bracket assembly. Some posts, for example, are mounted within the top edge of the visor body and snap-fit into a clip while others include posts extending axially from the end of the visor to provide additional support for heavier or larger visors and particularly the type which may include illuminated vanity mirror accessories mounted thereto.

Such visors are typically pre-manufactured and installed by the automobile manufacturer with a given visor configuration being installed in particular vehicle body styles. In some instances, the visors are integrated into a headliner assembly which includes not only the visors but other vehicle accessories such as overhead consoles and the like. In such instances, each visor has a body with a shape designed for the particular vehicle body into which it is to be installed during manufacture of the vehicle.

Many modern vehicles include illuminated vanity mirror visors for the convenience of the occupants. Such visors typically are relatively thick due to the illuminated mirror package which is secured to a visor body which can be of a hollow core construction. With smaller vehicles however, thick visors present a problem since there is typically little room in the headliner area for recessed storage of such visors. As a result, it is difficult to incorporate conventional illuminated vanity mirror visors into compact-sized vehicles.

SUMMARY OF THE INVENTION

The visor mounting system of the present invention permits a single design mounting assembly to accommodate a variety of different, relatively thin, visor body configurations. This construction allows the more costly components of the overall visor assembly to be manufactured efficiently and be used for a variety of different visor body styles used in different vehicles.

The visor mounting system embodying the present invention can be used with visor bodies of different shapes which include a pocket extending between front and rear surfaces and extending from an upper longitudinally extending edge of the visor body. The mounting assembly includes a pivot rod assembly including a torque device which extends within the housing which includes a blade-like frame which extends into the pocket of the visor body and includes means for securing the frame to the visor body. In one embodiment, the frame includes a mirror assembly.

Preferably, the means for attaching the housing to the visor body include snap-in tab means so that different configured visor bodies can be easily attached to the visor mounting assembly during final assembly of a visor for a given vehicle body style. In a preferred embodiment, the mounting assembly also includes illumination means for the mirror.

Such a system therefore provides an efficient visor construction which allows any one of a number of different, relatively thin, visor bodies to be employed with the universal mount. These and other features, objects and advantages of the present invention will become apparent upon reading the following description thereof together with reference to the accompanying drawings in which:

BRIEF DESCRIPTION OF THE DRAWINGS

FIG. 7 is an enlarged, fragmentary perspective view of the opposite end of the visor mounting system shown in FIG. 6;

FIG. 8 is an enlarged, fragmentary perspective view of the upper rear edge of the visor assembly shown in FIG. 6;

FIG. 9 is an enlarged, fragmentary perspective view of the upper right corner of the visor mounting assembly shown in FIG. 1, shown with the lens removed;

FIG. 10 is an enlarged, perspective view of the snap-in lens used in connection with the assembly shown in FIG. 9;

DETAILED DESCRIPTION OF THE PREFERRED EMBODIMENT

Figure 1:
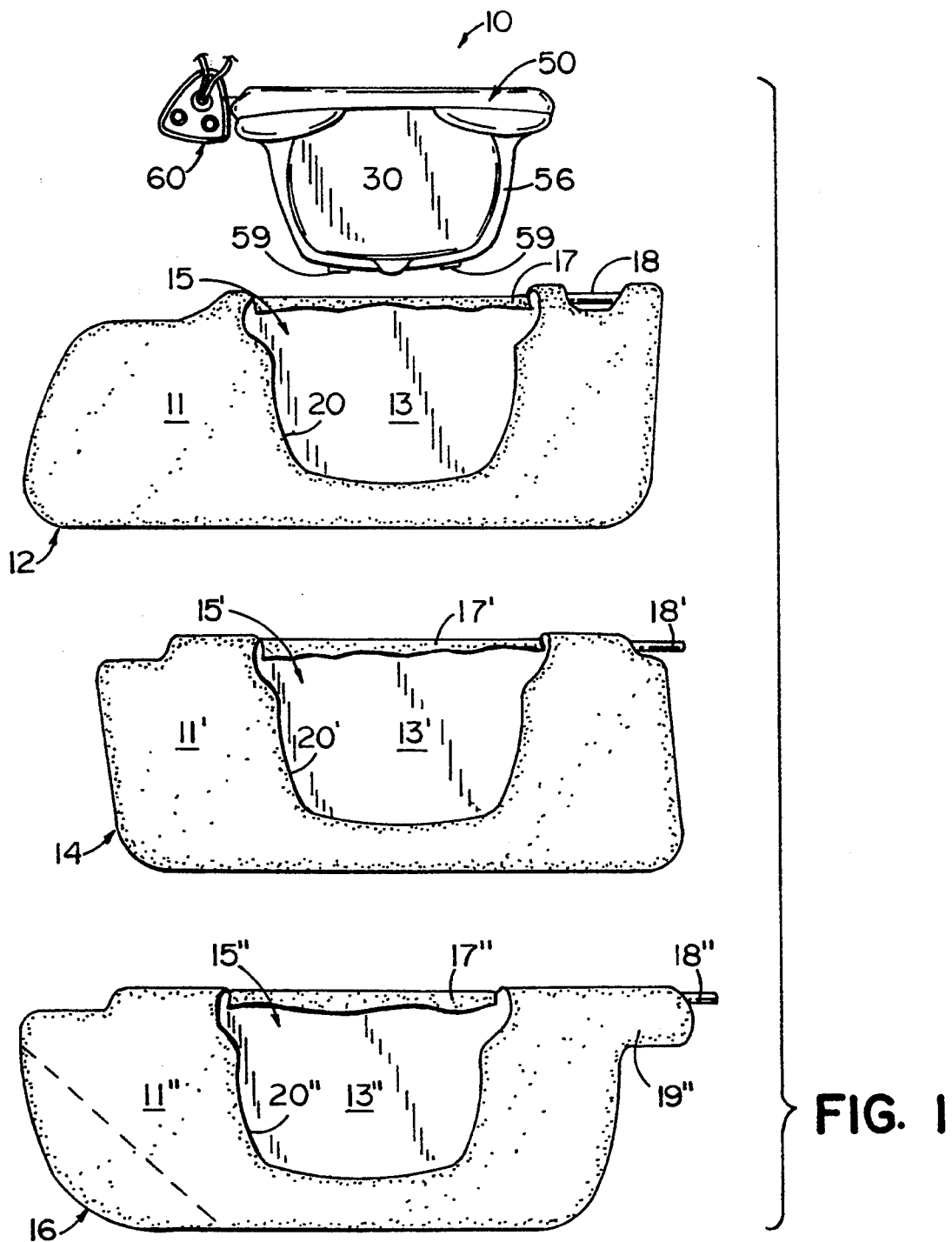
FIG. 1 is an exploded view of the universal visor mounting system shown with three different visor bodies which can be attached to the mounting system.

Referring initially to FIG. 1, there is shown a universal visor mounting system 10 to which there can be snapfitted during assembly, any one of a number of different relatively thin visor bodies 12, 14, or 16, depending upon the vehicle into which the visor formed by the combination of the mounting assembly 10 and one of the visor bodies 12, 14, 16 or other style visor body is mounted. Each of the visor bodies 12, 14, and 16 include a front surface 11 and a rear surface 13 having a pocket 15 formed therebetween and extending from the upper longitudinal edge 17 of the visor body.

In FIG. 1, the second and third visor body elements are identified by prime (') and double prime (") symbols to differentiate the common elements of the different visor bodies shown. As seen in the top view of FIG. 12, the visor body 12 is relatively thin and includes a pocket 15 defined by the spacing between the front wall 11 and rear wall 13 of the visor body shown. Each of the visor bodies 12, 14, and 16 may include an auxiliary support such as clip 18 mounted within the visor body 12, outwardly extending post 18' extending from the edge of the upper right corner of visor body 14, or a similar support post 18" extending from a protrusion 19" on visor body 16.

Each of the different visor bodies 12, 14, and 16 are styled to fit within a particular vehicle body and vehicle interior with the auxiliary posts 18, 18' and 18" (when provided) spaced to fit within a post-receiving socket mounted to the vehicle in a conventional manner for supporting the end of the visor opposite the universal mounting assembly 10. To partially define the pocket 15 for each of the visor bodies, a slot or cutout 20 is formed downwardly through the top edge 17 of the visor bodies and into the front wall 11, sufficiently to allow a mirror assembly associated with the visor mounting assembly to be exposed from the front surface of the visor when the visor is in a lowered use position, as shown in FIGS. 2 and 3.

The visor mounting system 10 includes a housing 50 with an enlarged generally U-shaped channel 52 (FIG. 11) at an upper longitudinal edge for attaching the housing to the visor body and for receiving a visor pivot rod assembly 60 including a torque device 66 (FIGS. 7 and 8). The mounting assembly 10 also includes a generally blade-like flat planar frame 56 which integrally extends from one wall of the channel 52 and is shaped to extend within any one of the different visor bodies illustrated in FIG. 1. The frame includes means such as tabs 59 for interlocking the frame to a selected visor body.

Figure 2:
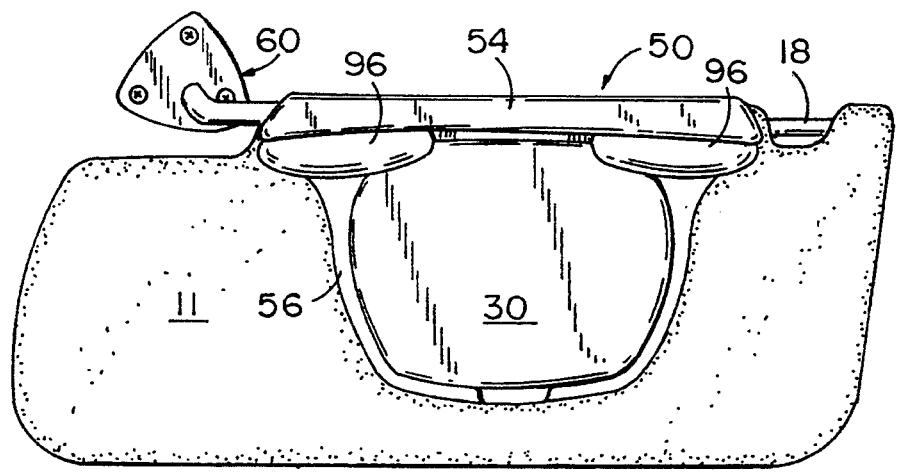
FIG. 2 is a front elevational view of a visor including the universal mounting system of the present invention.
Figure 3:
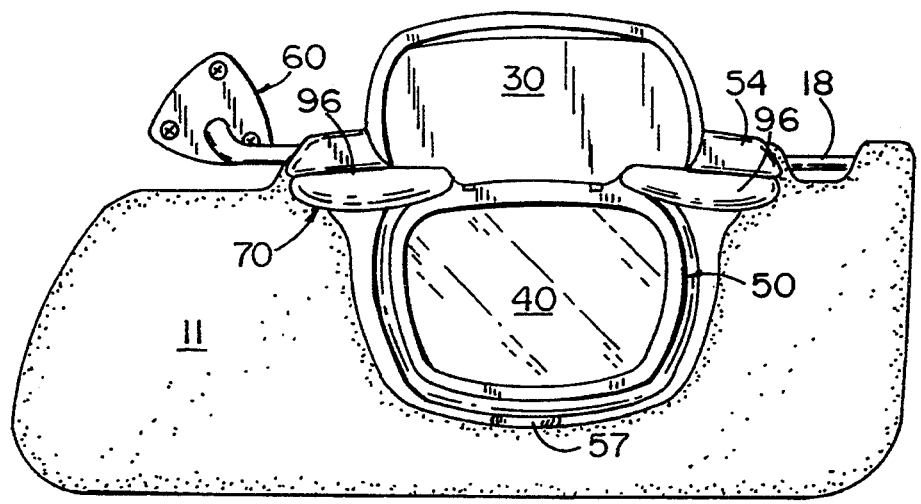
FIG. 3 is a front elevational view of the structure shown in FIG. 1, shown with the cover open to expose the mirror.
Figure 4:
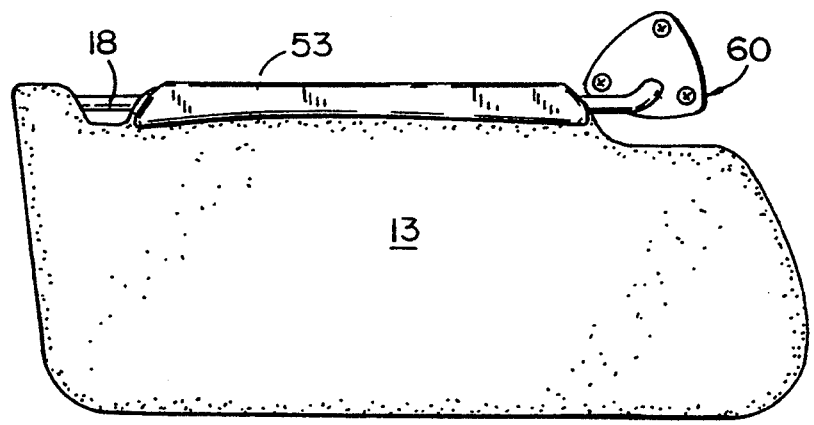
FIG. 4 is a rear elevational view of the visor shown in FIGS. 2 and 3.
Figure 12:
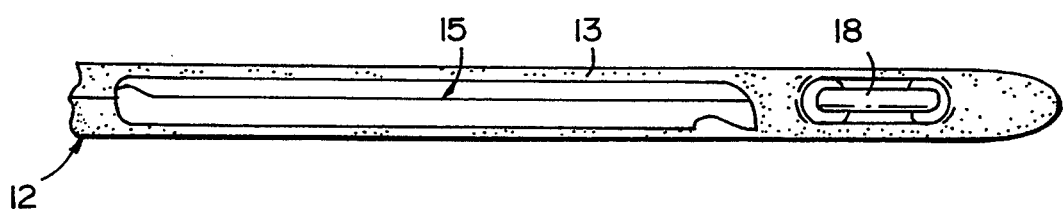
FIG. 12 is a top elevational view of the visor body shown in FIGS. 1-4.

An assembled visor with a body style shown as visor body 12 in FIGS. 1 and 12, is shown in FIGS. 2–4. In FIG. 2, the driver's side visor is shown in what would be a lowered use position with the cover 30 of the preferred embodiment of the visor mounting assembly 10 in a closed position. In FIG. 3, the cover is moved to an open position exposing a mirror 40 for use. Mirror 40 is mounted to the frame 56 of housing 50 of the visor mounting assembly 10. Mounting assembly 10 also includes an elbow bracket assembly 60 for attachment of the mounting assembly and visor body secured thereto to the vehicle. The universal mounting assembly also may include illumination means 70 for selectively providing illumination for use of the mirror 40 when the cover is moved to an open position as shown in FIG. 3. In the preferred embodiment, the illumination means 70 comprises a pair of lights 90 mounted on opposite sides of the upper portion of the mirror 40 and covered by light diffusing lenses 96 as described in further detail below.

Figure 5:
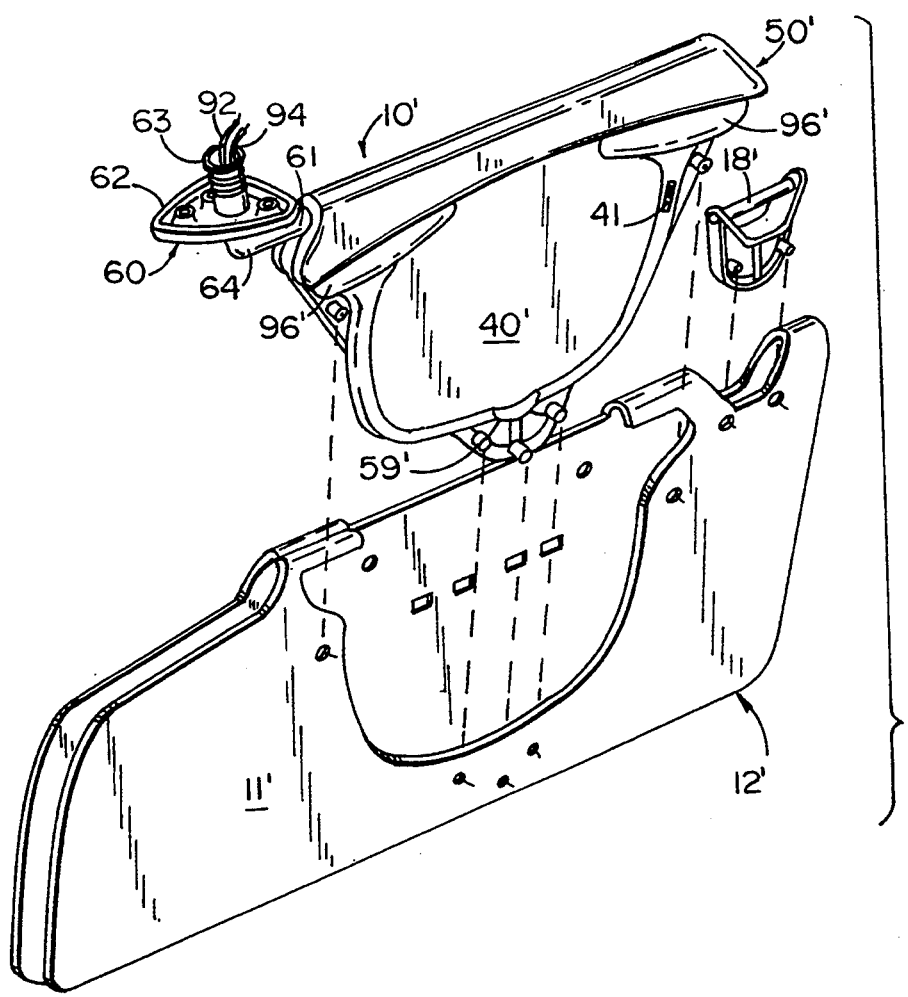
FIG. 5 is an exploded perspective view of one embodiment of the visor mounting system embodying the present invention and a visor body used in connection therewith.

In the drawings, two different but related universal mounting assemblies 10 are shown with assembly 10' of FIG. 5 being the same as that shown in FIGS. 1–4 with the exception that it does not include a cover for its mirror 40'. Each of the embodiments uses the same visor pivot assembly 60 which, as best seen in FIG. 5, includes a mounting plate 62 for attachment of the visor mounting assembly and visor body secured thereto to a vehicle. Mounting plate 62 typically is triangular with three apertures for receiving mounting screws securing the triangular plate and thus the visor to the vehicle. In other embodiments, snap-in visor mounts may be employed in connection with the visor pivot rod 61. In either embodiment, the pivot rod includes an elbow 64 and an upwardly extending end 63 which extends into the mounting plate with conventional means for anchoring the end 63 to rotatably mount the pivot rod 61 to the plate 62 for allowing the visor, when in its lowered position, to swivel from a front windshield position to a side window position in a conventional manner. The elongated leg of the visor pivot rod 61 is coupled to and extends through a torque device 66 (FIG. 8) which can be of the type described in U.S. Pat. No. 5,004,289. The torque device 66 is secured to the housing 50 by a plurality of fasteners 67, as best seen in FIG. 8, for permitting the housing, and the visor body 12 secured thereto, to rotate about the pivot rod 61 between a raised stored position against the vehicle roof and a lowered use position as illustrated in FIGS. 2 and 3.

Figure 6:
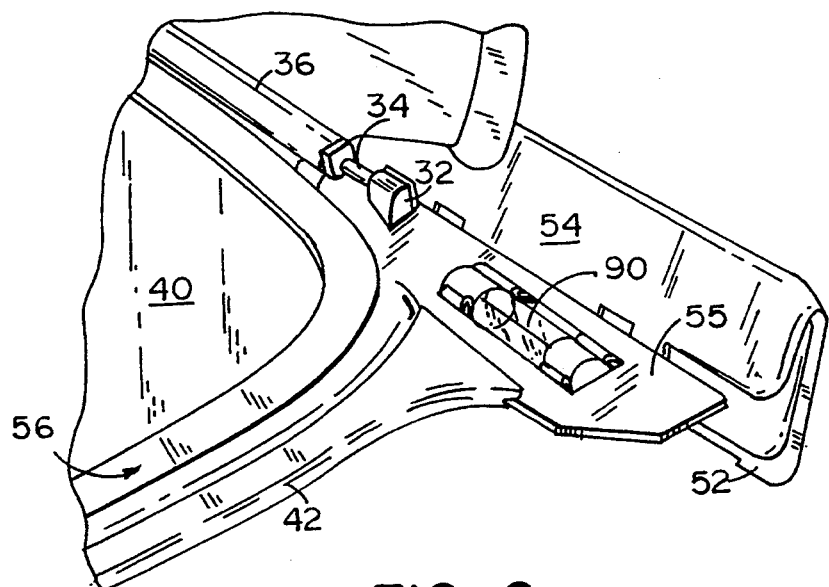
FIG. 6 is an enlarged, fragmentary perspective view of a portion of the universal visor mounting system shown in FIGS. 1-4.
Figure 11:
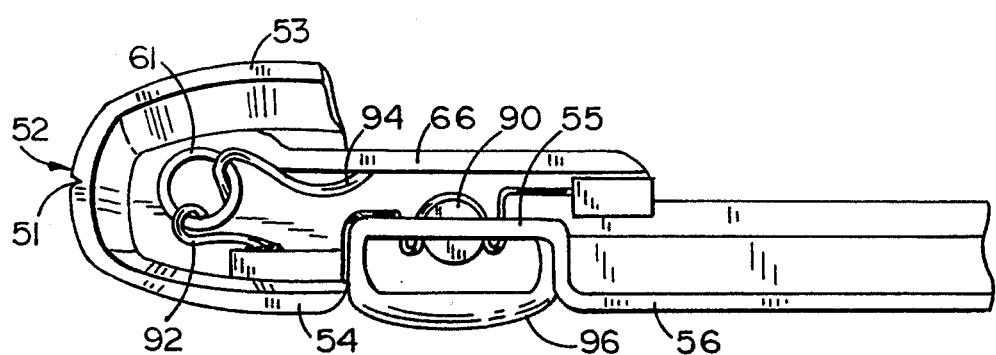
FIG. 11 is an enlarged, fragmentary right end view of the visor mounting assembly shown in FIG. 1.

Housing 50 includes a generally U-shaped upper channel 52 which, as best seen in FIG. 11, has a top edge 51, a rear wall 53, and a front wall 54 which integrally extends inwardly at opposite ends to define a pair of light receiving sockets in recessed wall areas 55 (FIGS. 6 and 11). The front wall 54 also extends downwardly to integrally define a mirror frame 56 into which the mirror 40 is mounted in a conventional manner, as by snap-fitting or by a suitable bonding adhesive. As seen in the Figures, the mirror frame 56 which is integral with the front wall 54 of housing 50 circumscribes and holds the mirror in position. Frame 56 may include a small recess 57 at its lower edge for allowing access for opening the cover 30. The fasteners 67 attach the torque fitting 66 to the back side of the upper portion of the mirror frame, as best seen in FIG. 8.

Housing 50 includes a pair of pivot axle receiving bosses located in spaced relationship near the top of the housing for pivotally receiving the cover 30. As best seen in FIG. 9, the bosses 32 are located at the inner edge of recessed walls 55 and each receive a pivot axle 34 mounted to the top edge 36 of cover 30 for pivotally mounting the cover to the housing 50. Springs (not shown) are coupled between the housing 50 and cover 30 to assist the movement of the cover between open and closed positions as illustrated in FIGS. 3 and 2, respectively.

Mounted within apertures 57' in recessed walls 55 of the housing are lamps 90 forming part of the illumination means 70 and which are covered by diffusing lenses 96 (FIG. 10). The housing includes a recessed wall 55 on each side, as best seen in FIGS. 1–3, with a lens 96 positioned thereover to provide illumination for use of the mirror. The lamps 90 are cartridge-type lamps which fit within electrical sockets coupled by means of conductors 92 and 94 (FIG. 11) which extend through the hollow visor pivot rod 61 to the vehicle's electrical system in a conventional manner to selectively apply electrical operating power to the lamps 90. In the covered embodiment of the invention, when the cover is moved to an open position, a switch will be actuated in a conventional manner for applying operating power to the lamps.

Housing 50 includes slots 58 (FIG. 9) formed in the sides of recessed wall 55 at spaced locations for receiving tabs 98 on the diffusing lens 96 (FIG. 10) such that the lenses 96 can snap in the housing and be easily removed if necessary to replace the lamps 90. A pair of spaced tabs 59 (FIG. 1) are integrally formed at the lower edge of housing 50, and located on the inner bottom edge of frame 56 for engaging slots formed in the rear wall 13 of the visor body 12 for assisting in mounting the assembly 10 to the visor body. In the embodiment shown in FIG. 5, a single tab 59' is employed and includes posts which interengage the forward wall 11' of the uncovered visor body 12' shown. The rear wall 53 of the generally U-shaped top 52 of housing 50 fits over the rear wall 13 of the visor as seen in FIG. 4 with the rear wall 53 of the housing extending along the top edge of the visor, and the front wall 54 extending over the top of the visor body and compressibly engaging the opposed upper edges of the cut-out recess 20 in the visor body, as best seen in FIGS. 2-4. Thus, the visor mounting assembly 10 is snap-fit within the pocket 15 of the visor body 12 with tabs 59 interlocking the lower portion of the assembly to the visor body and the U-shaped upper member 52 compressibly engaging the top edge of the visor body.

The peripheral edge of the mirror frame 56 also provides a decorative bezel for the trim appearance of the visor as best seen in FIG. 3. As best seen in FIGS. 6 and 7, the mirror frame 56 includes a peripheral flange 42 which overlies the upholstered outer surface of the visor body 12 to provide a neat trim appearance to the visor when in its assembled position, as seen in FIGS. 2-3. The housing may include tabs in addition to the lower tabs 59 which interfit with the rear and or front wall of the visor body for snap-locking the visor body to the universal visor mounting assembly 10 which fits within the pocket 15 of the visor body, regardless of the specific shape of the visor body selected.

In the FIG. 5 embodiment, the mounting assembly 10' is substantially the same as the embodiments shown in FIGS. 1-4 but does not include a cover for the vanity mirror 40'. As can be appreciated, other embodiments of the invention may include a mounting assembly 10 which also may not include the illumination means, which in the embodiment shown in FIG. 5 are actuated by a manual switch 41 when it is desired to illuminate the lamps behind lenses 96' on either side of the top of mirror 40'.

Although the housing 50 in the preferred embodiment is an integral housing with a generally U-shaped upper member 52 as best seen in FIG. 11, the housing could be formed of multiple sections which are fastened together using conventional fastening means or by snap-fitting together if desired. In the preferred embodiment however, the housing is integrally molded of a suitable polymeric material, such as polycarbonate, to provide the most economical construction for the visor mounting system. The configuration of the universal mounting assembly provides the thickest part of the construction at the top of the visor in parallel alignment with the pivot axle axis and a relatively thin, blade-like mirror and supporting frame for coupling to the visor body. Such construction allows the visor body itself to be very thin to accommodate easy storage in compact vehicles while still providing an attractive and useful vanity mirror visor which may be covered and illuminated.

It will become apparent to those skilled in the art that various modifications to the preferred embodiments of the invention as described herein can be made without departing from the spirit or scope of the invention as defined by the appended claims.

The embodiments of the invention in which an exclusive property or privilege is claimed are defined as follows:

1. A visor assembly comprising:
    a pair of spaced apart opposed generally planar structural walls each having a peripheral edge, said edges joined to each other to define a visor body with a space between said walls wherein one of said walls includes a cut out portion extending from one longitudinal edge toward an opposite edge to define a pocket extending between said walls from said longitudinal edge of said visor body; said pocket shaped to receive a visor mounting assembly; and
    a visor mounting assembly including a housing with an elbow bracket assembly for mounting said housing to a vehicle, said housing including at least one mounting tab extending into said pocket of said visor body and cooperating with at least one of said walls of said visor body for inter-coupling said visor body and mounting assembly.

2. The visor as defined in claim 1 wherein said housing includes a mirror frame and mirror mounted therein.

3. The visor as defined in claim 2 and further including means for illuminating said mirror.

4. The visor as defined in claim 3 and further including cover means coupled to said housing for selectively covering said mirror.

5. A universal visor mounting assembly for use with any one of a plurality of different visor bodies each including a pocket for receiving the mounting assembly, said mounting assembly comprising:
    at least one visor body having opposed spaced walls, wherein one of said walls is cut out from a longitudinal edge of said visor body to define a pocket in said visor body;
    a pivot rod assembly;
    a housing including means for receiving said pivot rod assembly and a mirror frame integral with said housing for holding a mirror therein, wherein said means for receiving said pivot rod assembly includes a generally U-shaped channel extending along one edge of said housing;
    a mirror mounted in said frame; and
    fastening means formed on said housing for fastening said housing to any one of a plurality of visor bodies only be extending into and cooperating with said pocket and said walls of said visor body, wherein said housing further includes tab means for engaging a visor body for snap-fitting said assembly into a visor body.

6. The assembly as defined in claim 5 wherein said housing further includes a cover pivotally mounted thereto for selectively covering said mirror.

7. The assembly as defined in claim 6 wherein said housing includes illumination means for said mirror.

8. The visor as defined in claim 5 wherein said generally U-shaped channel is defined by a pair of spaced walls joined by a cross member, and wherein said mirror frame extends from one wall of said U-shaped channel.

9. The visor as defined in claim 8 wherein said frame includes a mirror mounted therein.

10. The visor as defined in claim 9 and further including means for illuminating said mirror.

11. The visor as defined in claim 10 and further including cover means coupled to said housing for selectively covering said mirror.

* * * * *

UNITED STATES PATENT AND TRADEMARK OFFICE
CERTIFICATE OF CORRECTION

PATENT NO. : 5,374,097
DATED : December 20, 1994
INVENTOR(S) : Philip C. George et al.

It is certified that error appears in the above-indentified patent and that said Letters Patent is hereby corrected as shown below:

Column 6, line 41;

"only be" should be --only by--.

Signed and Sealed this

Nineteenth Day of September, 1995

Attest:

BRUCE LEHMAN

Attesting Officer

Commissioner of Patents and Trademarks